3,637,877
MODIFIERS FOR SELECTIVE HYDROGENATION CATALYSTS FOR CYCLIC POLYENES

Gerhard P. Nowack and Marvin M. Johnson, Bartlesville, Okla., assignors to Phillips Petroleum Company
No Drawing. Filed June 3, 1970, Ser. No. 43,204
Int. Cl. C07c 5/06, 5/14, 5/16
U.S. Cl. 260—666 A                          10 Claims

ABSTRACT OF THE DISCLOSURE

A method of modifying iron, cobalt and nickel-containing catalysts employed for the hydrogenation of diolefins and triolefins to monoolefins which involves introducing into contact with the reactants a material selected from the group consisting of organic acids, aldehydes, ketones, anhydrous ammonia, amines and methanol.

---

This invention pertains to the catalytic hydrogenation of diolefins and triolefins to produce monoolefins.

In one of its more specific aspects, this invention pertains to materials effective in modifying the selectivity of certain catalysts in the hydrogenation of diolefins and triolefins to monoolefins.

In application Ser. No. 6,971 entitled "Selective Hydrogenation Employing Metal Arsenide or Antimonide Catalyst," filed by one of us with Donald C. Tabler, which application is incorporated herein by reference, there is disclosed and claimed a new process and catalyst system for the hydrogenation of diolefins and triolefins to monoolefins. That process employs a group of catalysts comprising metal arsenides or antimonides wherein the metal can be iron, cobalt or nickel or mixtures thereof.

These metal arsenides and antimonides have the general formula $MY_x$ in which M is one of iron, cobalt and nickel, Y is arsenic or antimony and $x$ has a value from about 0.33 to about 2.0. These catalysts are deposited on conventionally-employed supports such as alumina, silica and pumice either by precipitation or by impregnation from a solution of the soluble salt of the metal concerned.

In the hydrogenation, the feedstream containing the olefin is contacted with the catalyst and with hydrogen at a temperature of from about 75° F. to about 750° F. at a pressure of from about atmospheric to about 1000 p.s.i.g. The olefin feed is passed in contact with the catalyst at liquid hourly space velocities of from about 0.1 to about 10 with hydrogen being introduced at a rate sufficient to provide a hydrogen to olefin molar ratio of from about 1 to 1 to about 50 to 1.

The method of this invention is directed towards introducing into the reaction zone a substance which affects the selectivity of the hydrogenation reaction or which limits the reaction in respect to the formation of saturated products.

According to the method of this invention there is provided a process for treating a feedstream to selectively hydrogenate diolefins and triolefins and isomerize monoolefins which comprises passing a feedstream comprising the olefin and hydrogen and a material selected from the group consisting of organic acids, aldehydes, ketones, anhydrous ammonia, amines and methanol into contact with a catalyst comprising an antimony or arsenic derivative of at least one of nickel, iron and cobalt under hydrogenation conditions and recovering the hydrogenation product.

Accordingly, it is an object of this invention to provide a group of materials which improve the selectivity of hydrogenation processes employing metal arsenide and antimonide catalysts.

It is another object of this invention to provide a method of improving the selectivity of hydrogenation reactions.

Selective hydrogenation of olefins, containing two or more ethylenic bonds, is an important method of preparing many olefinic compounds, having fewer ethylenic bonds than the feed, which are not otherwise obtainable. For example, cyclopentadiene, available in relatively large amounts as a by-product from naphtha cracking units, can be selectively hydrogenated to cyclopentene in high yield. Similarly, cyclooctene and cyclododecene can be prepared by the selective hydrogenation of cyclic dimers and trimers of 1,3-butadiene by the method of this invention. Accordingly, the inclusion of materials, such as those hereinafter defined and which are the subject of this invention, find wide use in limiting or controlling the nature of the end product of such reaction.

In general, the hydrogenation reactions into which the modifiers are introduced are those defined in the previously-mentioned application. These hydrogenation reactions are directed towards polyenes having more than one double bond per molecule. In general, any polyene, capable of being hydrogenated to the monoolefin can be selectively hydrogenated by the process of this invention. This process is particularly applicable to polyenes having up to about 15 carbon atoms per molecule.

Similarly, the reaction conditions set forth in the previously-mentioned application and as mentioned above are employed in the method of this invention.

The modifiers which are effectively employed in the method of this invention are organic acids, aldehydes, ketones, anhydrous ammonia, amines and methanol. These materials can be employed from about 1 weight percent up to as high as about 60 weight percent of the olefin. They can be introduced into contact with the catalyst in any manner including inclusion with the olefin feedstream or with the hydrogen, or separately.

Among the organic acids which are employable under the method of this invention are formic, acetic, propionic, decanoic, and 3-methylhexanoic. Generally, the suitable organic acids will contain from about 1 to about 10 carbon atoms.

Among the aldehydes which are employable under the method of this invention are formaldehyde, acetaldehyde, propionaldehyde, butyraldehyde, and capraldehyde. Generally, these aldehydes will contain from about 1 to about 10 carbon atoms.

Among the ketones which are employable under the method of this invention are acetone, butanone, methyl octyl ketone, di(n-butyl)ketone, and methyl isobutyl ketone. Generally, the ketones will contain from about 3 to about 10 carbon atoms.

Among the amines which are employable under the method of this invention are methylamine, ethylmethylamine, butylamine, decylamine, 3-ethylheptylamine, dimethylbutylamine, trimethylamine, and di-n-butylamine. Generally, the amines will contain from about 1 to about 10 carbon atoms.

The following examples will serve to illustrate the operability of the method of this invention. They are not, however, to be considered as limiting the invention to the specific conditions and reactants employed.

EXAMPLE I

It was desired to selectively hydrogenate 1,5-cyclooctadiene to cyclooctene. A group of runs was conducted, a different modifier being employed in each run, except that the control run did not employ a modifier.

In each run, except for the addition of the individual modifier, essential conditions were maintained substantially identical.

A catalyst comprising 17.2 weight percent nickel arsenide on alumina and activated in hydrogen, was contacted with hydrogen and a feedstream comprised of 9.5 weight percent 1,5-cyclooctadiene, 85.7 weight percent cyclohexane and 4.8 weight percent of one of the modifiers listed below. In that instance in which no modifier was employed, the feedstream comprised 90 weight percent cyclohexane.

The hydrogenation reactions were conducted at 400° F. and 400 p.s.i.g. at a feedstream rate of 3 LHSV and a hydrogen feed rate of about 35 to 1 olefin molar ratio. In each run, conversion was greater than 99.8 percent.

The results were as follows. In Run No. 1, no modifier was employed.

| Run. No. | Modifier | Product analysis, wt. percent | |
|---|---|---|---|
| | | Cyclooctene | Cyclooctane |
| 1 | None | 82.0 | 18.0 |
| 2 | Methanol | 92.7 | 6.9 |
| 3 | Acetaldehyde | 96.1 | 2.8 |
| 4 | Acetic acid | 97.2 | 2.1 |
| 5 | Acetone | 97.2 | 1.9 |
| 6 | Water (feed saturated) | 82.0 | 18.0 |

The above data indicate the operability of the method of this invention and the effectiveness of the various organic compound modifiers employed.

EXAMPLE II

A run was made employing substantially anhydrous ammonia as a modifier. For this purpose, 1,5 - cyclooctadiene was hydrogenated employing a catalyst comprising 17.2 weight percent nickel arsenide on alumina, the catalyst having been activated with hydrogen.

A feedstream, comprised of 90 weight percent cyclohexane and 10 weight percent cyclooctadiene, was saturated with anhydrous ammonia at 78° F. and atmospheric pressure, requiring about 0.02 mole fraction of ammonia for saturation of feed.

This feedstream was then contacted with the catalyst at 422° F. and 400 p.s.i.g. at a feedstream rate of 0.35 LHSV and a hydrogen to olefin feed molar ratio of about 36 to 1.

The product, upon analysis, indicated 96.6 weight percent cyclooctene and 2.0 weight percent cyclooctane, with the balance of the product being 1,3-cyclooctadiene and $C_8$ bicyclics. In comparison with Run No. 1 of Example I, these data indicate that substantially anhydrous ammonia is an effective modifier for the hydrogenation process concerned.

In the foregoing examples, the selective hydrogenation of 1,5-cyclooctadiene to cyclooctene was employed to illustrate the invention because of the difficulty of hydrogenating 1,5-cyclooctadiene to cyclooctene. Therefore, this reaction illustrates the effectiveness of the modifiers of this invention.

It will be evident from the foregoing that various modifications can be made to the method of this invention. Such are considered, however, as being within the skill of the invention.

What is claimed is:

1. In the selective hydrogenation process in which cyclic polyenes having up to about 15 carbon atoms per molecule are hydrogenated to cyclic monoenes by contact with hydrogen and a catalyst having the general formula $MY_x$ in which M is selected from the group consisting of iron, cobalt and nickel, and Y is selected from the group consisting of iron, cobalt and nickel, and Y is selected from the group consisting of arsenic and antimony and in which $x$ has a value of from about 0.33 to about 2.0, the improvement comprising introducing into said contact a modifier comprising methanol or a material selected from the group consisting of organic acids, aldehydes, ketones, and anhydrous amines to improve the selectivity of said hydrogenation.

2. The process as defined in claim 1 in which said modifier is introduced into said contact in an amount from 1 weight percent to about 60 weight percent of said cyclic polyene.

3. The process as defined in claim 1 in which said organic acids have from about 1 to about 10 carbon atoms and comprise formic acid, acetic acid, propionic acid, decanoic acid and 3-methylhexanoic acid.

4. The process as defined in claim 1 in which said aldehydes have from about 1 to about 10 carbon atoms and comprise formaldehyde, acetaldehyde, propionaldehyde, butyraldehyde and capraldehyde.

5. The process as defined in claim 1 in which said ketones have from about 3 to about 10 carbon atoms and comprise acetone, butanone, methyl octyl ketone, di(n-butyl)ketone and methyl isobutyl ketone.

6. The process as defined in claim 1 in which said amines have from about 1 to about 10 carbon atoms and comprise methylamine, ethylamine, butylamine, decylamine, 3-ethylheptylamine, dimethylbutylamine, trimethylamine and di-n-butylamine.

7. The process as defined in claim 1 in which said modifier is introduced into said contact in a hydrogen stream comprising said modifier.

8. The process as defined in claim 1 in which said catalyst comprises nickel arsenide and said modifier comprises a material selected from the group consisting of methanol, acetaldehyde, acetic acid, acetone and ammonia.

9. The process as defined in claim 1 in which said catalyst comprises 17.2 weight percent nickel arsenide on alumina and said modifier comprises acetone in an amount of 5 weight percent of said cyclic polyene.

10. The process as defined in claim 1 in which said catalyst comprises 17.2 weight percent nickel arsenide on alumina, said cyclic polyene comprises 1,5-cyclooctadiene and said modifier comprises ammonia.

References Cited

UNITED STATES PATENTS

| 3,102,899 | 9/1963 | Cannell | 260—439 |
| 2,360,555 | 10/1944 | Evans et al. | 260—666 A |
| 3,022,359 | 2/1962 | Wiese et al. | 260—666 A |
| 3,360,577 | 12/1967 | Pickles | 260—666 A |
| 3,446,871 | 5/1969 | Maxfield | 260—683.15 |

DELBERT E. GANTZ, Primary Examiner

V. O'KEEFE, Assistant Examiner